United States Patent
Kang et al.

(10) Patent No.: US 12,097,958 B2
(45) Date of Patent: Sep. 24, 2024

(54) UNMANNED AERIAL VEHICLE COMPRISING SAFETY GUARD

(71) Applicant: Samsung Electronics Co., Ltd., Suwon-si (KR)

(72) Inventors: Yonghun Kang, Suwon-si (KR); Junho Park, Suwon-si (KR); Seunghwan Jung, Suwon-si (KR); Soosang Yang, Suwon-si (KR); Sangjun Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 355 days.

(21) Appl. No.: 17/049,920

(22) PCT Filed: Apr. 16, 2019

(86) PCT No.: PCT/KR2019/004575
§ 371 (c)(1),
(2) Date: Oct. 22, 2020

(87) PCT Pub. No.: WO2019/208966
PCT Pub. Date: Oct. 31, 2019

(65) Prior Publication Data
US 2021/0237861 A1     Aug. 5, 2021

(30) Foreign Application Priority Data
Apr. 23, 2018   (KR) .................. 10-2018-0046525

(51) Int. Cl.
*B64F 1/06*     (2006.01)
*B64C 23/00*    (2006.01)
(Continued)

(52) U.S. Cl.
CPC ............ *B64C 39/064* (2013.01); *B64C 23/00* (2013.01); *B64U 30/26* (2023.01); *B64U 30/299* (2023.01)

(58) Field of Classification Search
CPC ..... B64C 11/001; B64C 39/02; B64C 39/024; B64C 27/006; B64C 21/04; B64C 21/02;
(Continued)

(56) References Cited

U.S. PATENT DOCUMENTS 3,489,374 A * 1/1970 Morcom ................. B64C 39/06
                                                    244/93
4,021,135 A * 5/1977 Pedersen ................. F03D 1/04
                                                    415/908
(Continued)

FOREIGN PATENT DOCUMENTS

| CN | 104454331 A | 3/2015 |
| CN | 107161351 A | 9/2017 |

(Continued)

OTHER PUBLICATIONS

International Search Report and Written Opinion of the International Searching Authority in connection with International Application No. PCT/KR2019/004575 dated Jul. 19, 2019, 10 pages.
(Continued)

*Primary Examiner* — Philip J Bonzell
*Assistant Examiner* — Anna L. Gordon

(57) ABSTRACT

An unmanned aerial vehicle according to the present invention may comprise: a rotor-blade for providing thrust according to generation of main stream; and a safety guard disposed to surround the rotor-blade. The safety guard may comprise: a guide member which is disposed coaxially with the rotor-blade while having a gap between the guard member and the end of the rotor-blade, so as to stabilize, when the rotor-blade rotates, a flow field suctioned by a
(Continued)

negative pressure, and stably boost a discharge flow when the pressure is changed to a positive pressure; and a diffuser which is disposed coaxially with and radially spaced apart from the guide member, and generates a secondary flow toward the main stream to increase a flow rate.

9 Claims, 15 Drawing Sheets

(51) Int. Cl.
    *B64C 39/06*     (2006.01)
    *B64U 30/26*     (2023.01)
    *B64U 30/299*     (2023.01)
    *B64U 70/70*     (2023.01)
    *B64C 39/02*     (2023.01)

(58) Field of Classification Search
    CPC . B64C 2201/108; B64C 39/064; B64C 27/20; B64C 2201/024; B64C 39/016; B64U 30/26; B64U 30/30; B64U 30/299
    See application file for complete search history.

(56) References Cited

U.S. PATENT DOCUMENTS

| | | | |
|---|---|---|---|
| 4,796,836 | A | 1/1989 | Buchelt |
| 5,133,194 | A | 7/1992 | Army, Jr. et al. |
| 6,082,635 | A | 7/2000 | Seiner et al. |
| 6,786,038 | B2 | 9/2004 | Lair |
| 8,181,902 | B2 | 5/2012 | Schlunke |
| 8,794,902 | B1 * | 8/2014 | Van Ness, II ........ B64D 41/007 415/227 |
| 10,876,513 | B2 * | 12/2020 | Roberts ................... F03B 13/12 |
| 2006/0076456 | A1 * | 4/2006 | Layton ................. B64C 11/001 244/53 B |
| 2010/0119361 | A1 | 5/2010 | Presz, Jr. et al. |
| 2011/0217163 | A1 | 9/2011 | Camci et al. |
| 2011/0250066 | A1 | 10/2011 | De Roche |
| 2014/0151494 | A1 | 6/2014 | Cvrlje |
| 2017/0036771 | A1 * | 2/2017 | Woodman ............ B64U 30/293 |
| 2018/0057164 | A1 | 3/2018 | Lan et al. |

FOREIGN PATENT DOCUMENTS

| | | | | |
|---|---|---|---|---|
| EP | 2304226 | A1 | 4/2011 | |
| JP | 4482670 | B2 | 6/2010 | |
| KR | 10-2015-0064868 | A | 6/2015 | |
| KR | 10-2017-0016095 | A | 2/2017 | |
| KR | 101836999 | B1 * | 3/2018 | ............ B64C 27/08 |
| WO | WO-2007099543 | A2 * | 9/2007 | ............ B64C 15/02 |
| WO | 2009/129420 | A1 | 10/2009 | |
| WO | WO-2011126535 | A2 * | 10/2011 | ............ B64C 11/001 |
| WO | WO-2012068466 | A1 * | 5/2012 | ............... F03D 1/04 |

OTHER PUBLICATIONS

Notice of Preliminary Rejection dated Jun. 29, 2022 in connection with Korean Patent Application No. 10-2018-0046525, 13 pages.
Communication pursuant to Article 94(3) EPC dated Jun. 24, 2022 in connection with European Patent Application No. 19 792 804.7, 6 pages.
Supplementary European Search Report dated Apr. 29, 2021 in connection with European Patent Application No. 19 79 2804, 8 pages.
Notice of Patent Grant dated Nov. 24, 2022, in connection with Korean Application No. 10-2018-0046525, 5 pages.
The First Office Action dated Jul. 21, 2023, in connection with Chinese Application No. 201980027897.8, 17 pages.
The Second Office Action dated Apr. 20, 2024, in connection with Chinese Application No. 201980027897.8, 12 pages.

* cited by examiner

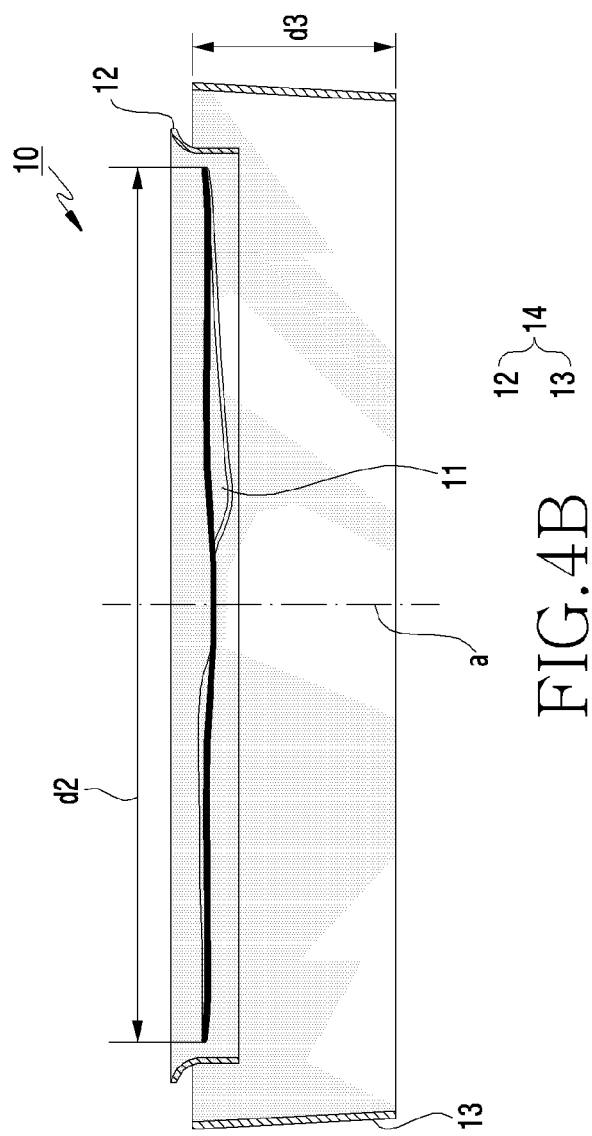

UNMANNED AERIAL VEHICLE COMPRISING SAFETY GUARD

CROSS-REFERENCE TO RELATED APPLICATIONS

This application is a 371 National Stage of International Application No. PCT/KR2019/004575, filed Apr. 16, 2019, which claims priority to Korean Patent Application No. 10-2018-0046525, filed Apr. 23, 2018, the disclosures of which are herein incorporated by reference in their entirety.

BACKGROUND

1. Field

Various embodiments of the disclosure relate to an unmanned aerial vehicle including a safety guard.

2. Description of Related Art

Unmanned aerial vehicles (UAVs), which have been used for military purposes, are rapidly being introduced into the fields of communication relay, traffic control, and logistics-transportation. Furthermore, the market for unmanned aerial vehicles is rapidly expanding, and related laws are also increasing.

Regulations related to unmanned aerial vehicles regulate unlicensed flight in no-fly zones and commercial photography using unmanned aerial vehicles without registration with a flight and aviation administration.

In recent years, interest in the safety of unmanned aerial vehicles has increased. In order to prevent the increase in the risk of injury to persons around an unmanned aerial vehicle due to a rotor blade rotating at high speed, which may occur due to inexperience in driving during take-off and landing, and to prevent damage due to collision of the vehicle body itself, there is a movement to stipulate the mandatory mounting safety guards.

In terms of the performance of an unmanned aerial vehicle, it may be advantageous to not install a safety guard. The installation of a safety guard increases the weight of the unmanned aerial vehicle and the resistance of the rotor blade, which does not have a good effect on thrust. However, since the installation is required from the viewpoint of laws and regulations, it may be important to determine the shape of the safety guard having less impact on performance.

SUMMARY

Conventional unmanned aerial vehicles have a structure in which there is no safety guard, or have a structure in which a safety guard covers not only the rotor blade, but also the entire vehicle body. Therefore, the unmanned aerial vehicles were designed in consideration of safety only, such as damage to the rotor blade due to a collision during flight and the risk of injury to persons around an unmanned aerial vehicle due to the rotor blade rotating at high-speed, rather than reflecting the flow characteristics of the rotor blade.

According to the results of flow analysis in terms of the shape of a conventional safety guard covering the entire rotor blade, when the safety guard is installed in order to ensure the safety of the rotor blade and the vehicle body, the weight of the vehicle body and the resistance of the rotor blade increase, but a flow field of a general pattern is formed. Therefore, the safety guard rather plays a role in lowering the performance of the unmanned aerial vehicle.

Various embodiments of the disclosure are able to provide an unmanned aerial vehicle including a safety guard increasing thrust in consideration of a flow caused by a rotor blade.

According to various embodiments of the disclosure, an unmanned aerial vehicle may include: a rotor blade for providing thrust according to generation of a main stream; and a safety guard disposed to surround the rotor blade, wherein the safety guard may include: a guide member, which is disposed coaxially with the rotor blade so as to have a gap with respect to an end of the rotor blade, the guide member being configured to stabilize a flow field suctioned by a negative pressure when the rotor blade rotates, and to stably push an ejection flow when switching to a positive pressure; and a diffuser, which is disposed coaxially with and radially spaced apart from the guide member, the diffuser being configured to generate a secondary flow toward a main stream to increase a flow rate.

An unmanned aerial vehicle according to various embodiments is capable of exhibiting an increased thrust thanks to the shape of a safety guard in which flow characteristics and stability against damage to the rotor blade are considered.

BRIEF DESCRIPTION OF THE DRAWINGS

FIG. 4B is a cross-sectional side view illustrating the safety guard of an unmanned aerial vehicle according to various embodiments of the disclosure;

DETAILED DESCRIPTION

Figure 1:
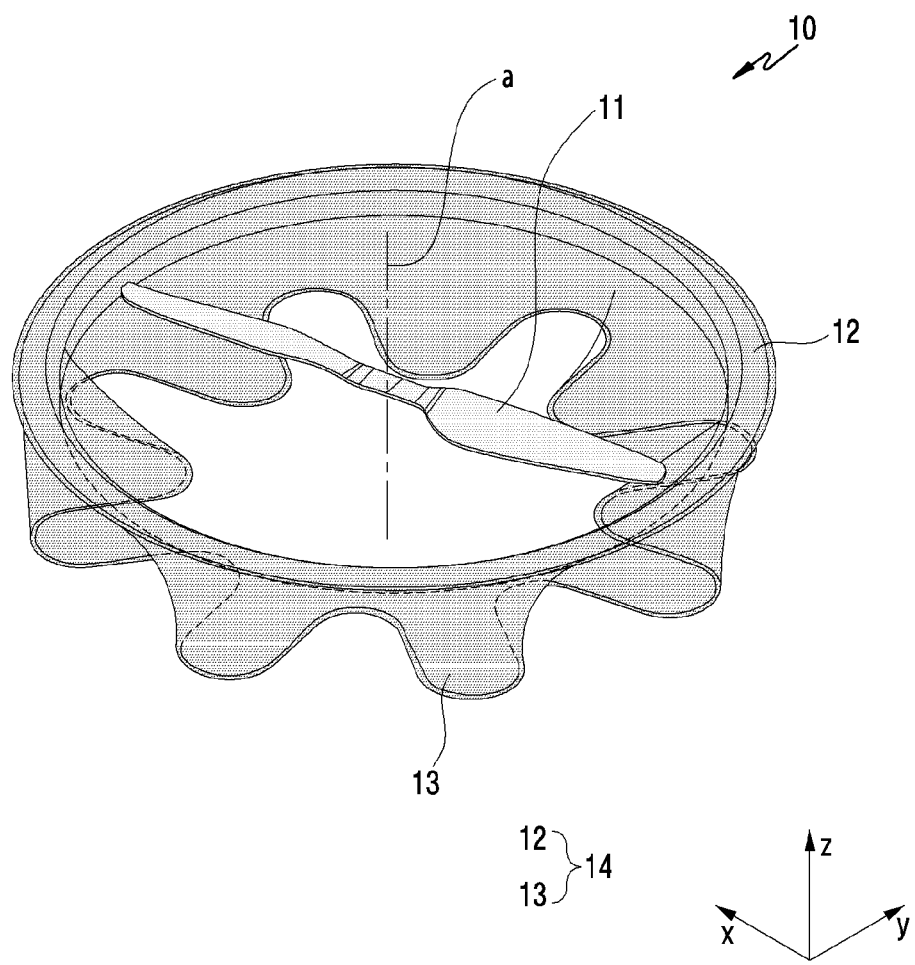
FIG. 1 is an exploded perspective view illustrating a safety guard of an unmanned aerial vehicle according to various embodiments of the disclosure.

Hereinafter, various embodiments of the disclosure will be described with reference to the accompanying drawings. However, they are not intended to limit the disclosure to particular embodiments, and should be construed to cover various modifications, equivalents, and/or alternatives thereof. With regard to the description of the drawings, the same or like reference numerals may be used to designate the same or like elements.

Figure 2:
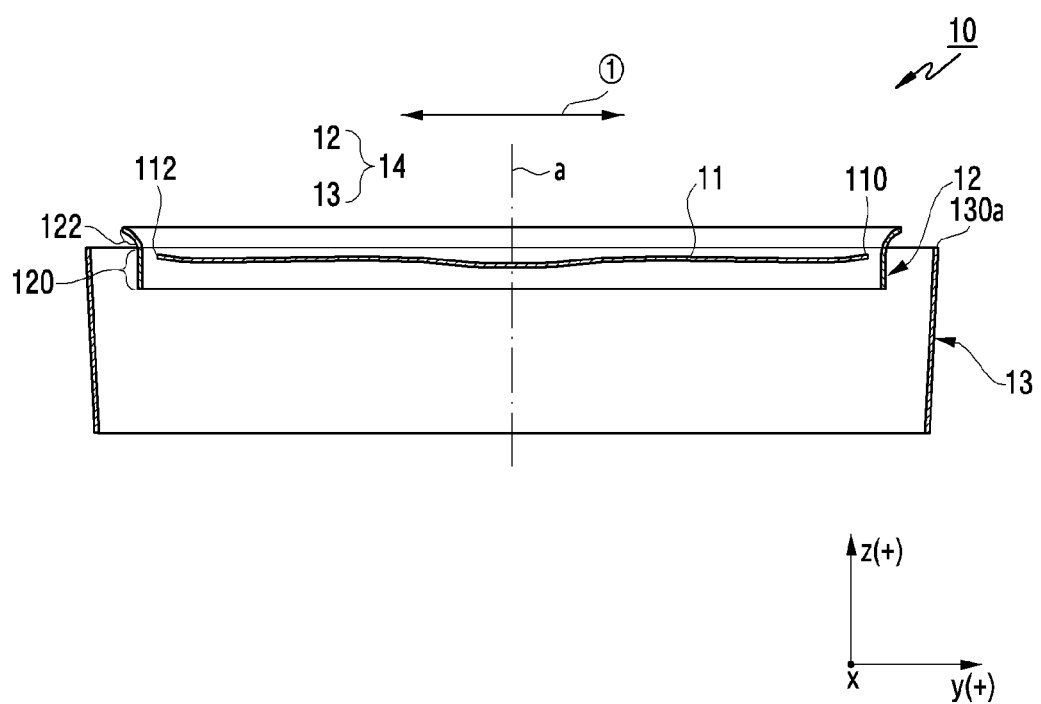
FIG. 2 is a cross-sectional view illustrating the safety guard of an unmanned aerial vehicle according to various embodiments of the disclosure.

FIG. 1 is an exploded perspective view illustrating a safety guard of an unmanned aerial vehicle according to various embodiments of the disclosure. FIG. 2 is a cross-sectional view illustrating the safety guard of an unmanned aerial vehicle according to various embodiments of the disclosure. In the orthogonal coordinate system used herein, the X axis may indicate the width direction, the Y axis may indicate the length direction, and the Z axis may indicate the height direction. The arrow may indicate the radial direction. Z(+) may be the upward direction, and Z(−) may be the downward direction.

Referring to FIGS. 1 and 2, an unmanned aerial vehicle 10 according to various embodiments may include a safety guard 14 in order to ensure the stability of the vehicle body and a rotor blade 11 against a collision. The safety guard 14 may be disposed to surround the rotor blade 11 so as to protect the rotor blade 11 from the external environment and to protect persons around the unmanned aerial vehicle from the unmanned aerial vehicle.

The unmanned aerial vehicle 10 according to various embodiments may include a rotor blade 11 and a safety guard 14. The rotor blade 11 according to various embodiments may generate a main stream according to the rotating operation thereof, thereby providing thrust for the unmanned aerial vehicle 10. The rotor blade 11 may rotate around the rotational central axis a so as to provide ascending thrust of the unmanned aerial vehicle 10.

The safety guard 14 according to various embodiments may be installed coaxially with the rotor blade 11. The safety guard 14 according to various embodiments is made of a synthetic resin material, and may include a guide member 12 and a diffuser 13. The safety guard 14 may be disposed radially around the rotor blade 11. The safety guard 14 may have a guide member 12 and a diffuser 13, each of which is disposed in a radial direction (arrow ①).

The guide member 12 according to various embodiments may be installed coaxially with the rotor blade 11, and may be disposed to have a gap with the ends 110 and 112 of the rotor blade 11. For example, the size of the gap may be approximately 5 mm in consideration of interference with surrounding components when the rotor blade 11 rotates. The rotor blade 11 may be accommodated in the inner space of the guide member 12.

The guide member 12 according to various embodiments may play a role of stabilizing a flow field suctioned under a negative pressure when the rotor blade 11 rotates, and stably pushing an ejection flow when switching to a positive pressure. For example, the guide member 12 may include a bell mouth. The guide member 12 may be disposed parallel to the rotor blade 11 without overlapping the upper region of the diffuser 13.

According to various embodiments, the guide member 12 may include a first portion 120 at least partially accommodated in the diffuser 13 and a second portion 122 disposed to protrude from the diffuser 13. For example, the guide member 12 may have a ring shape in cross section. The second portion 122 may extend from the first portion 120 in an oblique direction in which the diameter increases. The cross section of the second portion 122 may be formed in a curved shape. Each of the first portion 120 and the second portion 122 may have a ring shape in cross section.

According to various embodiments, the diffuser 13 may be disposed coaxially with the guide member 12 to be spaced apart from the guide member in a radial direction.

The diffuser 13 may provide a flow field for mixing surrounding fluids, such as secondary fluids, towards the main stream generated by the rotor-blade 11.

Figure 3A:
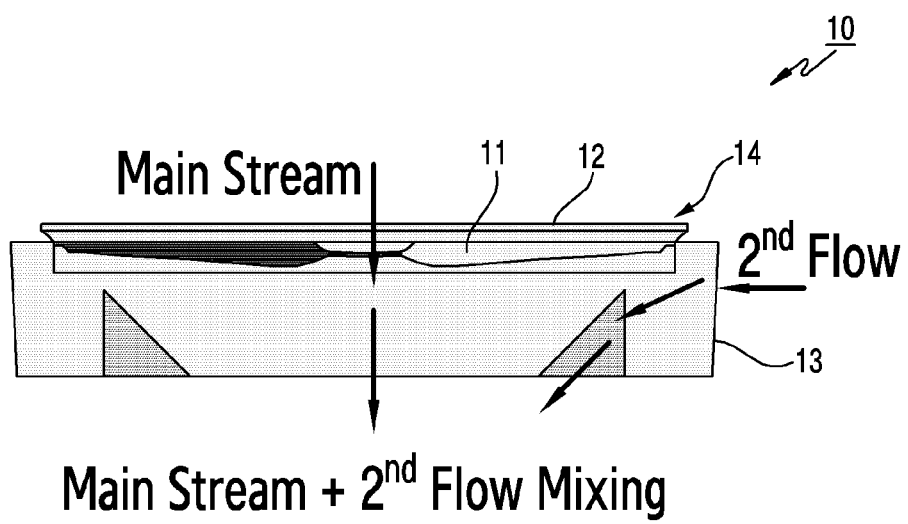
FIGS. 3A and 3B are graphs each showing flow of a fluid occurring due to the safety guard of an unmanned aerial vehicle according to various embodiments of the disclosure.
Figure 3B:
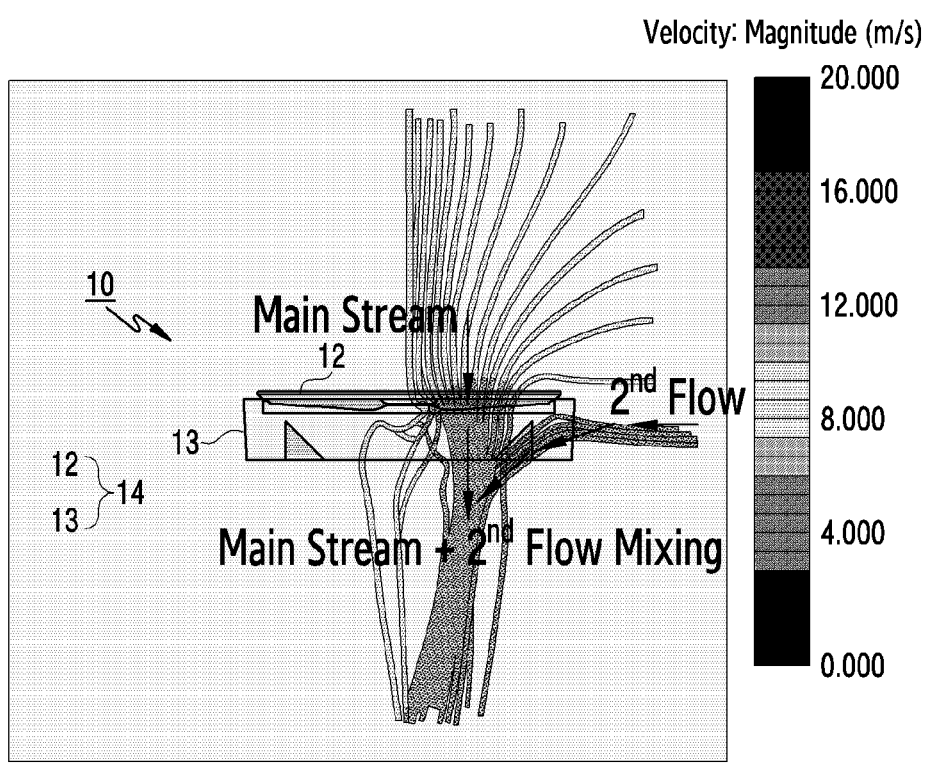
Figure 3C:
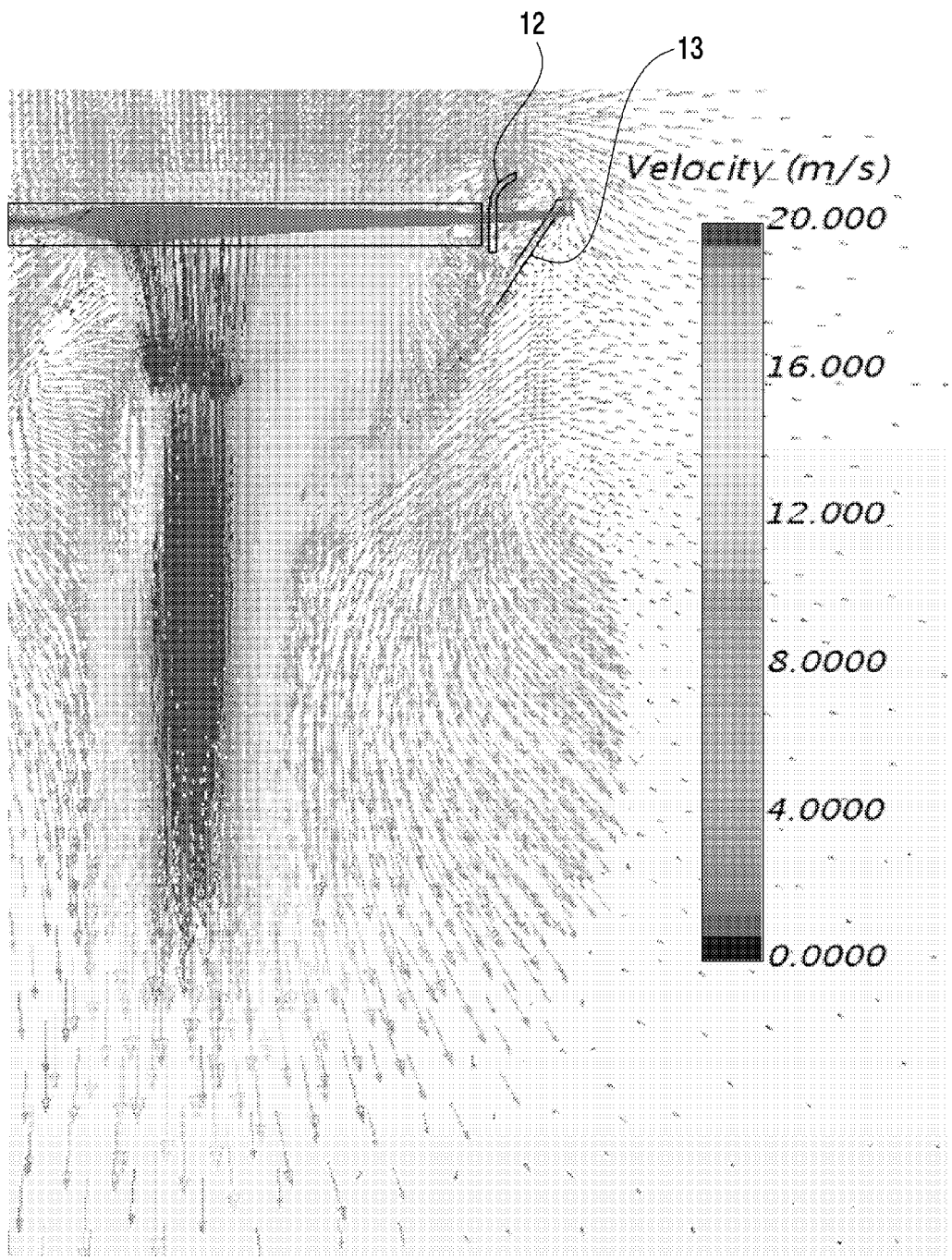
FIGS. 3C and 3D are graphs respectively showing a velocity field and a pressure field in the results of analysis of flow occurring due to the safety guard of an unmanned aerial vehicle according to various embodiments of the disclosure.
Figure 3D:
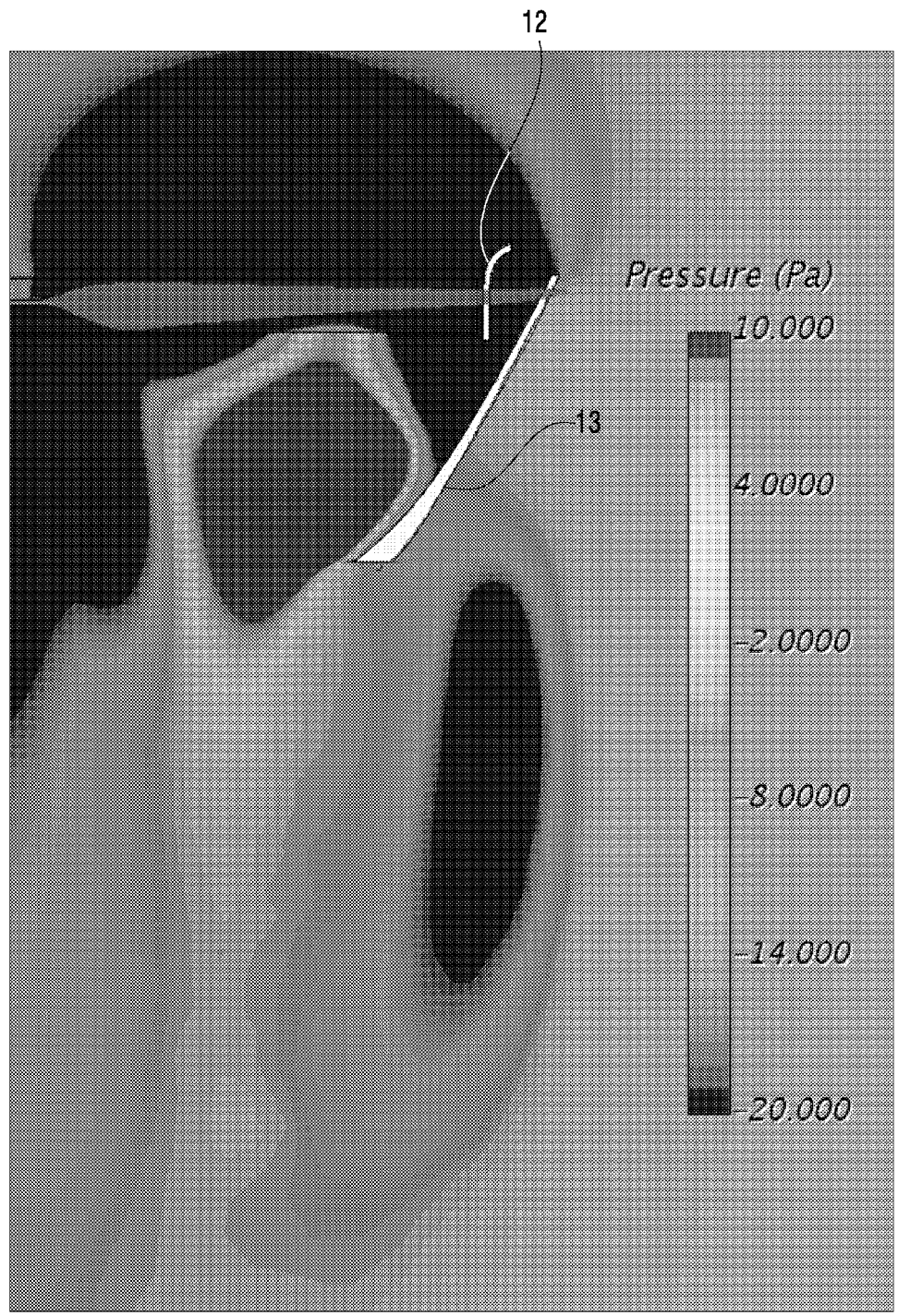

FIGS. 3A and 3B are graphs each showing flow of a fluid occurring due to the safety guard of an unmanned aerial vehicle according to various embodiments of the disclosure. FIGS. 3C and 3D are graphs respectively showing a velocity field and a pressure field in the results of analysis of flow occurring due to the safety guard of an unmanned aerial vehicle according to various embodiments of the disclosure.

Referring to FIGS. 3A to 3D, in a general flow field, flow in a region having a small momentum may be concentrated and ejected as flow having a large momentum. Accordingly, in the unmanned aerial vehicle 10 according to various embodiments, a flow field having a large momentum may be ejected (e.g., a main stream is generated) by the rotor-blade 11, and a flow field having a small momentum (e.g., a secondary flow field) may be formed around the safety guard 14.

According to various embodiments, in the flow of the unmanned aerial vehicle 10, since the secondary flow field (secondary air-flow) moves to a main stream to be mixed therewith, it is possible to obtain a result of amplifying a flow rate. Due to such an increase in flow rate, the pressure applied to and distributed on the ground by the unmanned aerial vehicle 10 increases, and thus it is possible to increase the thrust.

In the unmanned aerial vehicle according to various embodiments, the secondary flow is guided toward the main stream by a radial dual structure of the guide member. In particular, due to the shape of the diffuser, for example, due to the concave portions, the secondary flow may flow towards the main stream to be mixed therewith.

Figure 4A:
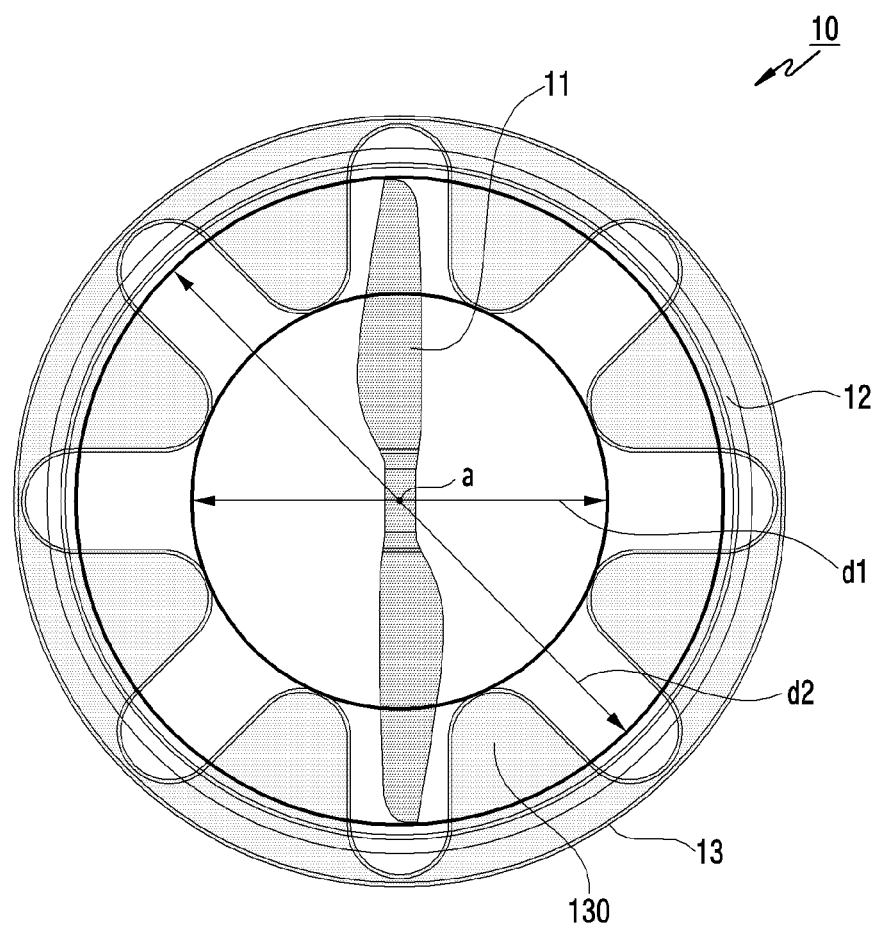
FIG. 4A is a plan view illustrating the safety guard of an unmanned aerial vehicle according to various embodiments of the disclosure.

FIG. 4A is a plan view illustrating the safety guard of an unmanned aerial vehicle according to various embodiments of the disclosure. FIG. 4B is a cross-sectional side view illustrating the safety guard of an unmanned aerial vehicle according to various embodiments of the disclosure.

Referring to FIGS. 4A and 4B, in the unmanned aerial vehicle 10 according to various embodiments, when the inner diameter of the lower end of the diffuser 13 is defined as d1 and the diameter of the rotor blade 11 is defined as d2, the ratio of d1/d2 may be 60 to 70%. For example, in the unmanned aerial vehicle 10 according to various embodiments, when the ratio of d1/d2 is 65%, the flow rate can be amplified to the highest level, thereby generating increased thrust.

In the unmanned aerial vehicle 10 according to various embodiments, when the diameter of the rotor blade 11 is defined as d2 and the vertical width of the diffuser 13 is defined as d3, the ratio of d3/d2 may be 20% to 25%. For example, in the unmanned aerial vehicle 10 according to various embodiments, when the ratio of d3/d2 is 22%, the flow rate can be amplified most greatly, thereby generating increased thrust.

Figure 5A:
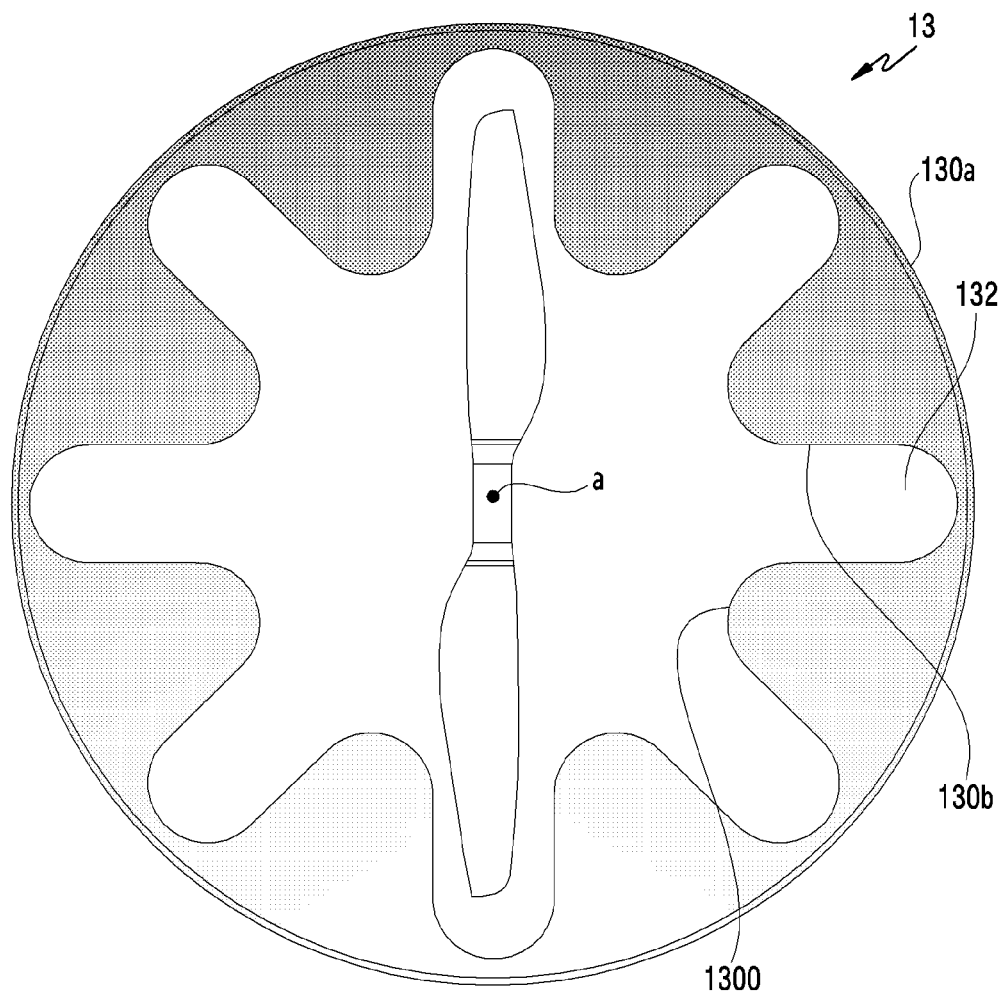
FIG. 5A is a plan view illustrating a diffuser according to various embodiments of the disclosure.
Figure 5B:
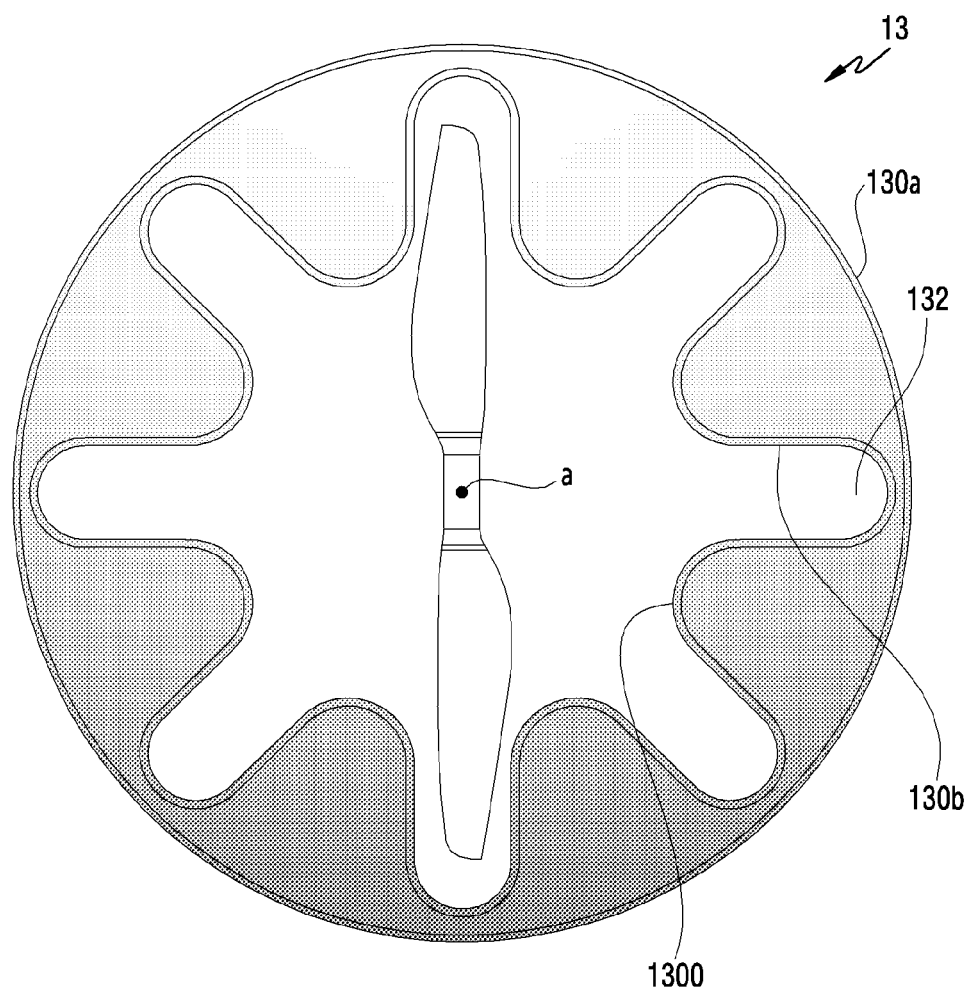
FIG. 5B is a bottom view illustrating the diffuser according to various embodiments of the disclosure.
Figure 5C:
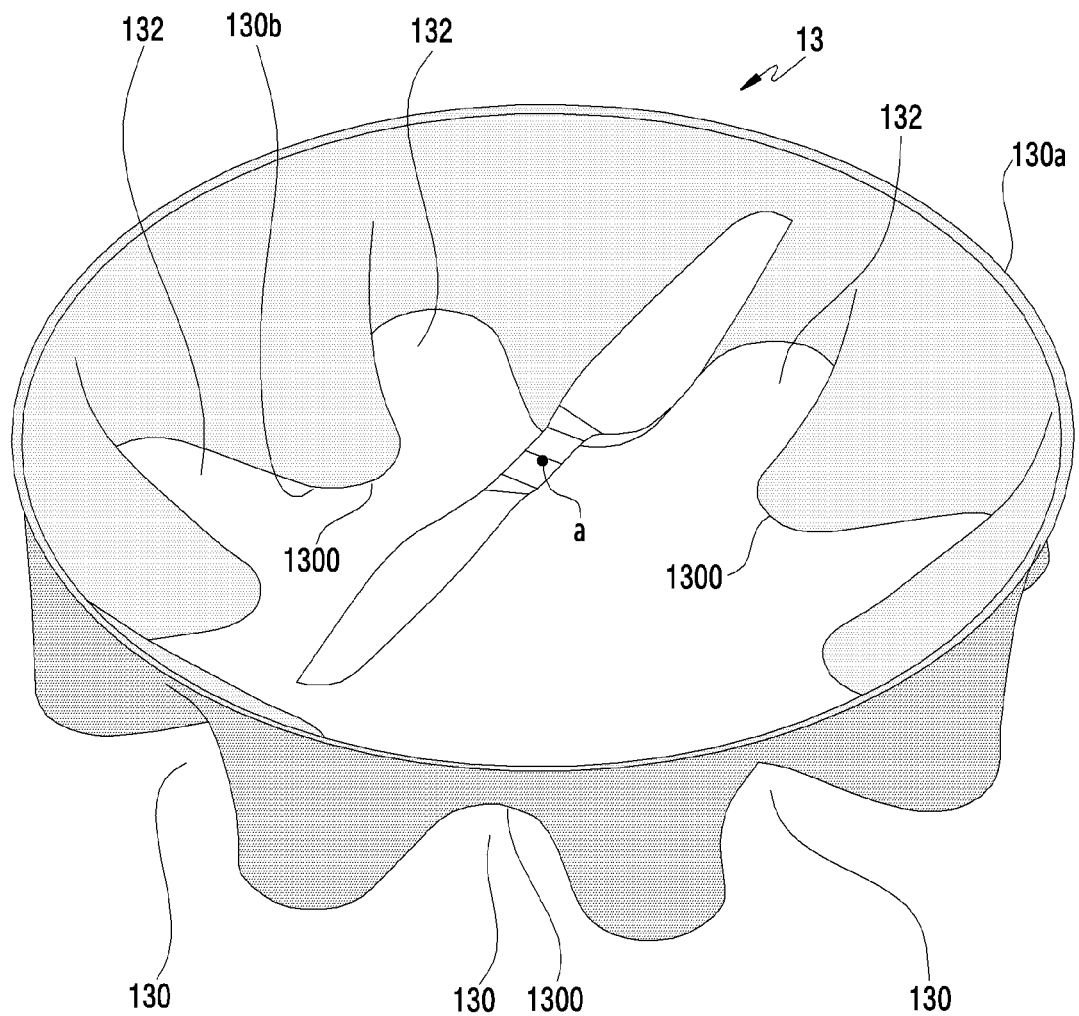
FIGS. 5C to 5E are perspective views each illustrating the diffuser according to various embodiments of the disclosure.
Figure 5D:
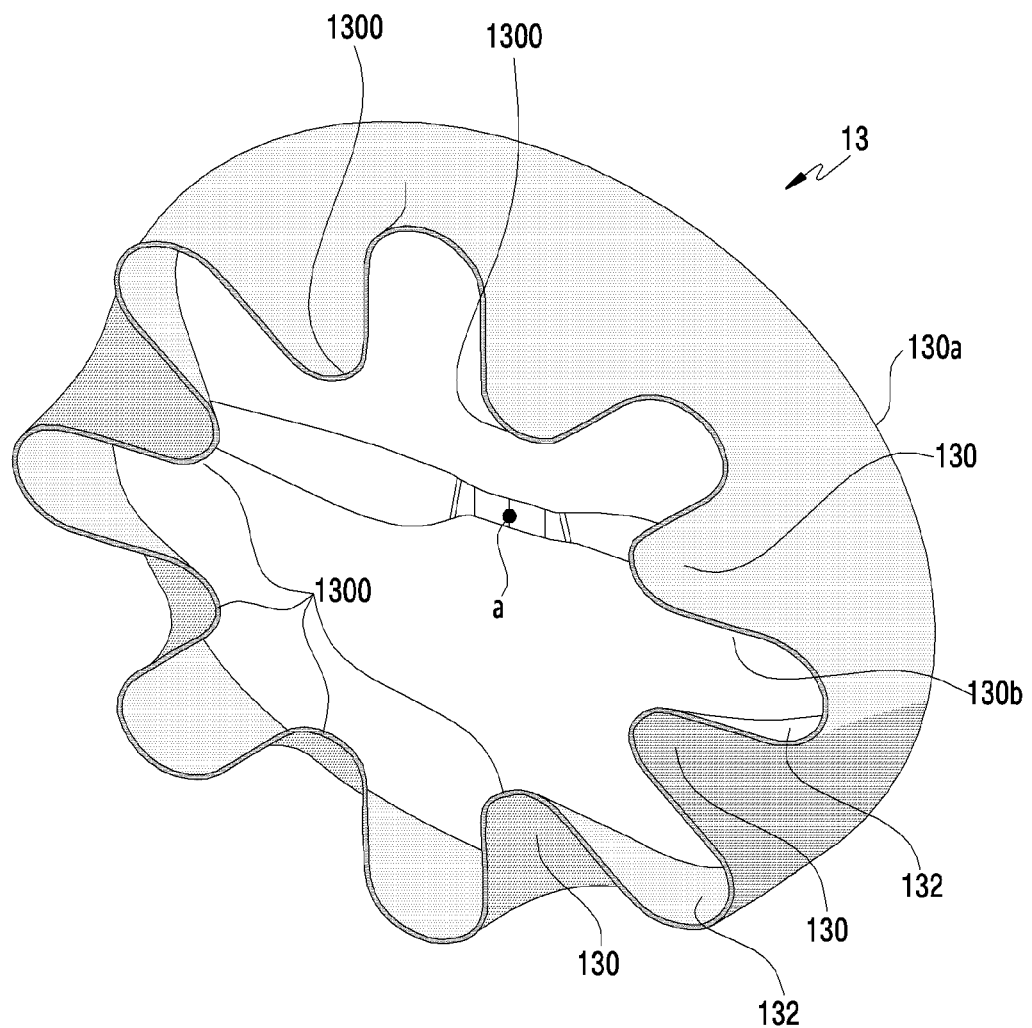
Figure 5E:
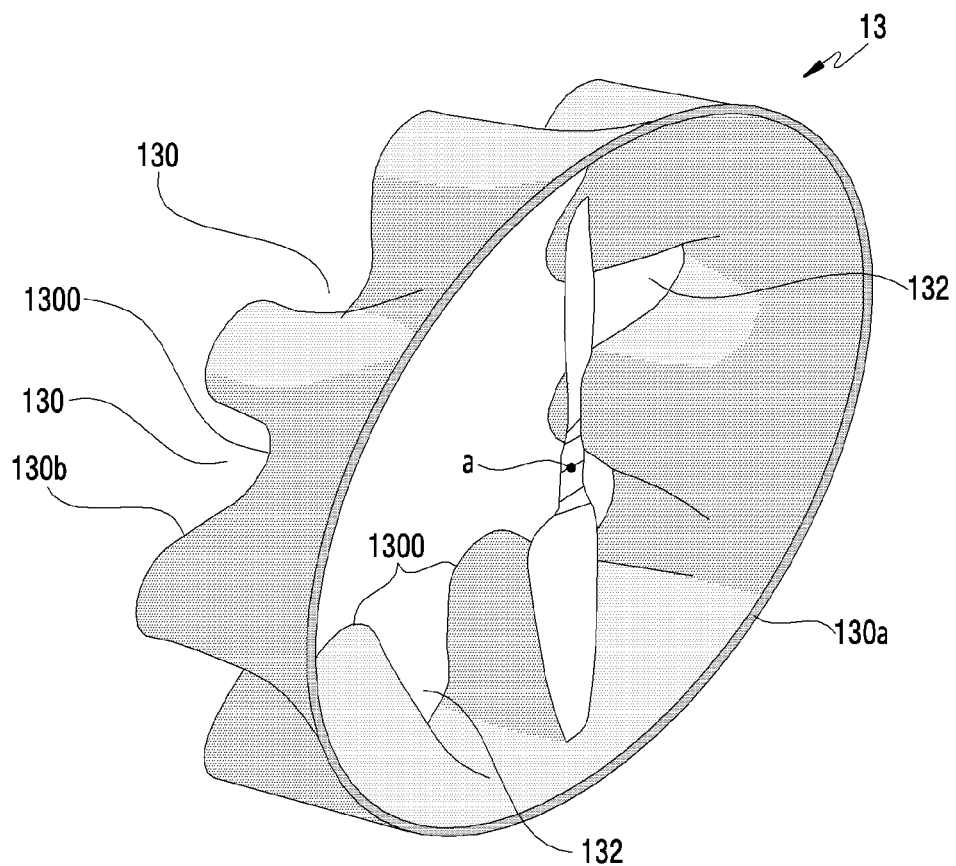

FIG. 5A is a plan view illustrating a diffuser according to various embodiments of the disclosure. FIG. 5B is a bottom view illustrating the diffuser according to various embodiments of the disclosure. FIG. 5C to 5D are perspective views each illustrating the diffuser according to various embodiments of the disclosure.

Referring to FIGS. 5A to 5E, the shape of the diffuser 13 according to various embodiments will be described.

Referring to FIGS. 5A to 5E, the diffuser 13 according to various embodiments may include a top end 130a having a ring shape and a bottom end 130b having a morning glory petal shape. For example, the shape of the bottom end 130b of the diffuser 13 may include multiple concave portion 130 arranged symmetrically, and the number of multiple concave portion 130 may be eight.

For example, the number of concave portion 130 in the diffuser 13 need not be limited to eight, but may be four, six, or ten. In addition, the diffuser 13 may include multiple convex portions 132 due to the multiple concave portion 130. Each of the convex portions 132 may be positioned between respective adjacent concave portion 130. The concave portions 130 and the convex portions 132 may be configured integrally with each other, and may be connected to each other in a curved shape. In addition, each concave portion 130 defines a space by an inclined wall, and the secondary flow generated by the rotation of the rotor blade may advance towards the main stream (center axis) following the inclined wall.

The diffuser 13 according to various embodiments may have a shape in which the convex portions 132 and the concave portion 130 gradually increase from the top end 130a to the bottom end 130b. In the diffuser 13, the secondary flow generated by the rotor blade 11 flows towards the main stream to be mixed therewith by the concave portion 130, and thus the flow rate can be amplified most greatly.

The diffuser 13 according to various embodiments may have a shape in which the concave portion 130 and the convex portions 132 gradually increase from the top end 130a to the bottom end 130b.

Each concave portion 130 according to various embodiments may have an opening shape having a curvature in the corresponding inner edge region 1300. Respective concave portion 130 may be symmetrically arranged vertically and horizontally around the central axis a, and the portion having a curvature formed in respective inner edge regions 1300 are symmetrically arranged around the central axis a.

Figure 6:
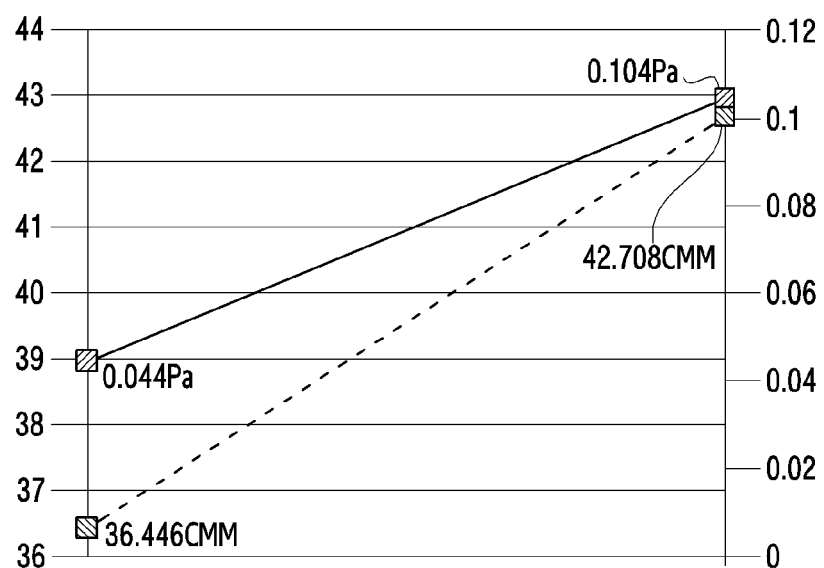
FIG. 6 illustrates graphs that show flow rates and average pressures on the bottom of an unmanned aerial vehicle including a conventional safety guard and an unmanned aerial vehicle including a safety guard according to various embodiments of the disclosure, respectively.

FIG. 6 illustrates graphs that show flow rates and average pressures on the bottom of an unmanned aerial vehicle including a conventional safety guard and an unmanned aerial vehicle including a safety guard according to various embodiments of the disclosure, respectively.

Referring to FIG. 6, among the performance indices of the unmanned aerial vehicle including a conventional safety guard and the unmanned aerial vehicle 10 including the safety guard 14 having a shape in which stability against damage and flow characteristics were considered, differences in flow rate and pressure on a floor are compared as follows.

The flow rate of the unmanned aerial vehicle including a conventional safety guard is 36.446 cubic meter per minute (CMM), and the flow rate of the unmanned aerial vehicle 10 including the shape of the safety guard 14 is 42.708 cubic meter per minute (CMM). That is, it can be seen that compared to that of the conventional unmanned aerial vehicle, the flow rate of the unmanned aerial vehicle 10 including the shape of the safety guard 14 is increased by about 17%.

The pressure of the unmanned aerial vehicle including a conventional safety guard is 0.044 Pascal (Pa), and the pressure of the unmanned aerial vehicle 10 including the shape of the safety guard 14 is 0.104 Pa. That is, it can be seen that the pressure of the unmanned aerial vehicle 10 including the shape of the safety guard 14 increases approximately 2.5 times with reference to the floor, and the thrust is also increased by about 2.5 times due to the increase in pressure received from the floor.

Figure 7:
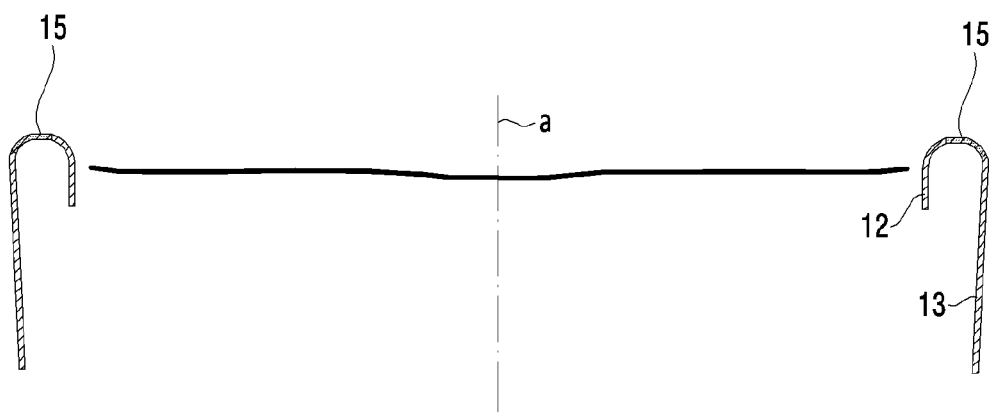
FIG. 7 is a cross-sectional view illustrating the safety guard of an unmanned aerial vehicle according to various other embodiments of the disclosure.

FIG. 7 is a cross-sectional view illustrating the safety guard of an unmanned aerial vehicle according to various other embodiments of the disclosure.

Referring to FIG. 7, the guide member 12 according to various embodiments may be integrally connected to the diffuser 13 by multiple connection frames 15 arranged at equal intervals. The connection frames 15 may be injection-molded integrally with the diffuser. For example, two, four or eight connection frames may be disposed at equal intervals. The connection frame 15 may be made of the same material as the guide member 12 and the diffuser 13.

Therefore, it can be seen that the unmanned aerial vehicle according to various embodiments can have an effect of increasing thrust thanks to the shape of the safety guard 14 in which flow characteristics as well as stability against damage to the vehicle body and the rotor-blade 11 were considered.

Various embodiments of the disclosure described and shown in the specification and the drawings have been presented to easily explain the technical contents of the disclosure and help understanding of the embodiments of the disclosure, and are not intended to limit the scope of the disclosure. Therefore, the scope of the disclosure should be construed to include, in addition to the embodiments disclosed herein, all changes and modifications derived on the basis of the technical idea of the disclosure.

The invention claimed is:

1. An unmanned aerial vehicle comprising:
   a rotor blade for providing thrust according to generation of a main stream; and
   a safety guard disposed to surround the rotor blade,
   wherein the safety guard comprises:
     a guide member comprising an interior surface and a an exterior surface opposite the interior surface, the interior surface disposed coaxially with and at a first distance from the rotor blade so as to have a gap between an end of the rotor blade and the interior surface, the guide member being configured to stabilize, when the rotor blade rotates, a flow field suctioned by a negative pressure, and to stably push an ejection flow when switching to a positive pressure; and
     a diffuser comprising an interior surface disposed coaxially with and radially spaced apart from the guide member at a second distance from the rotor blade forming a space defined by the interior surface of the diffuser and the exterior surface of the guide member, the diffuser being configured to generate a secondary flow from an exterior of the safety guard through the space toward the main stream to increase a flow rate and the first distance being different than the second distance, and the space being coplanar to the gap,
   wherein the guide member is integrally connected to the diffuser by multiple connection members which are arranged at an equal interval,
   wherein the diffuser comprises multiple concave portions and multiple convex portions that are symmetrically arranged at a bottom end, and the secondary flow is mixed toward the main stream by the multiple concave portions,
   wherein, when an inner diameter of the bottom end of the diffuser is defined as d1 and a diameter of the rotor blade is defined as d2, a ratio of d1/d2 is 60% to 70%, and wherein, when the diameter of the rotor blade is defined as d2 and a vertical width of the diffuser is defined as d3, a ratio of d3/d2 is 20% to 25%.

2. The unmanned aerial vehicle of claim 1, wherein the guide member comprises a bell mouth.

3. The unmanned aerial vehicle of claim 2, wherein, when viewed from above the rotor blade vertically, the guide member is disposed parallel to the rotor blade without overlapping the rotor blade, and is disposed in a top end region parallel to the diffuser without overlapping the diffuser.

4. The unmanned aerial vehicle of claim 1, wherein the rotor blade is dually surrounded by the guide member and the diffuser in a radial direction.

5. The unmanned aerial vehicle of claim 1, wherein the diffuser is disposed to be spaced apart from the guide member in a radial direction.

6. The unmanned aerial vehicle of claim 1, wherein the rotor blade is disposed to be accommodated in the guide member.

7. The unmanned aerial vehicle of claim 1, wherein at least a portion of the guide member is accommodated in the diffuser, and a remaining portion is disposed to protrude from a top end of the diffuser.

8. The unmanned aerial vehicle of claim 1, wherein the multiple concave portions comprise eight concave portions.

9. The unmanned aerial vehicle of claim 1, wherein the guide member has a ring shape.

* * * * *

UNITED STATES PATENT AND TRADEMARK OFFICE
CERTIFICATE OF CORRECTION

| | | |
|---|---|---|
| PATENT NO. | : 12,097,958 B2 | Page 1 of 1 |
| APPLICATION NO. | : 17/049920 | |
| DATED | : September 24, 2024 | |
| INVENTOR(S) | : Kang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 386 days.

Signed and Sealed this
Eighteenth Day of March, 2025

Coke Morgan Stewart
*Acting Director of the United States Patent and Trademark Office*